US012543667B2

(12) United States Patent
Lee-Parsons et al.

(10) Patent No.: US 12,543,667 B2
(45) Date of Patent: Feb. 10, 2026

(54) CULTIVATION AND TREATMENT OF PLANTS FOR THE PRODUCTION OF PLANT-DERIVED DRUGS

(71) Applicant: Northeastern University, Boston, MA (US)

(72) Inventors: Carolyn Lee-Parsons, Belmont, MA (US); Samuel Mortensen, Schaan (LI); Elisa Peter, Munich (DE)

(73) Assignee: Northeastern University, Boston, MA (US)

( * ) Notice: Subject to any disclaimer, the term of this patent is extended or adjusted under 35 U.S.C. 154(b) by 188 days.

(21) Appl. No.: 17/607,146

(22) PCT Filed: May 15, 2020

(86) PCT No.: PCT/US2020/033286
§ 371 (c)(1),
(2) Date: Oct. 28, 2021

(87) PCT Pub. No.: WO2020/232412
PCT Pub. Date: Nov. 19, 2020

(65) Prior Publication Data
US 2022/0183242 A1 Jun. 16, 2022

Related U.S. Application Data

(60) Provisional application No. 62/848,568, filed on May 15, 2019.

(51) Int. Cl.
| | |
|---|---|
| *A01G 22/60* | (2018.01) |
| *A01G 7/04* | (2006.01) |
| *A01G 7/06* | (2006.01) |
| *A01H 5/02* | (2018.01) |
| *A61K 36/24* | (2006.01) |

(52) U.S. Cl.
CPC ............ *A01G 22/60* (2018.02); *A01G 7/045* (2013.01); *A01G 7/06* (2013.01); *A01H 5/02* (2013.01); *A61K 36/24* (2013.01); *A61K 2236/15* (2013.01)

(58) Field of Classification Search
CPC . A01G 22/60; A01G 7/06; A01H 5/02; A61K 36/24; A61K 2236/15
See application file for complete search history.

(56) References Cited

U.S. PATENT DOCUMENTS

| | | |
|---|---|---|
| 2004/0058818 A1 | 3/2004 | Li |
| 2007/0151149 A1 | 7/2007 | Karpinski |

OTHER PUBLICATIONS

Bartok, J. W. Horizontal Air Flow is Best for Greenhouse Air Circulation; UMass Extension Greenhouse Crops and Floriculture Program, pp. 1-3, downloaded from: https://ag.umass.edu/greenhouse-floriculture/fact-sheets/horizontal-air-flow-is-best-for-greenhouse-air-circulation on Dec. 8, 2023. (Year: 2005).*

Chen et al. The Specific Responses To Mechanical Wound in Leaves and Roots of Catharanthus roseus Seedlings By Metabolomics; Journal of Plant Interactions, vol. 13, No. 1, pp. 450-460. (Year: 2018).*

Heil et al. How Plants Sense Wounds: Damaged-Self Recognition is Based On Plant-Derived Elicitors and Induces Octadecanoid Signaling; PLOS One, vol. 7, No. 2, pp. 1-9. (Year: 2012).*

Iwen, A.M. Mechanism of Jasmonic Acid Regulation of Terpenoid Indole Alkaloids in the Leaves of Catharanthus roseus; Retrieved from the University of Minnesota Digital Conservancy, https://hdl.handle.net/11299/206169. (Year: 2019).*

Cox, D. Understanding the Difference Between Water pH and Alkalinity; downloaded from: https://www.greenhousemag.com/article/greenhouse-0311-water-ph-alkalinity/ on Mar. 27, 2025, pp. 1-5. (Year: 2011).*

Wang, X. et al., "Ethylene-Induced Vinblastine Accumulation Is Related to Activated Expression of Downstream TIA Pathway Genes in Catharanthus roseus", BioMed Research International, (2016), vol. 2016, Article ID: 3708187, 8 pgs., doi: 10.1155/2016/3708187.

Ishikawa, H. et al., "Total Synthesis of Vinblastine, Vincristine, Related Natural Products, and Key Structural Analogues", J. Am. Chem. Soc., (2009), 131, pp. 4904-4916.

Duge De Bernonville, T. et al., "Folivory elicits a strong defense reaction in Catharanthus roseus: metabolomic and transcriptomic analyses reveal distinct local and systemic responses", Scientific Reports, (2017), 7, 40453, 14 pgs.; doi: 10.1038/srep40453.

(Continued)

*Primary Examiner* — Sharmila G Landau
*Assistant Examiner* — Paul C Martin
(74) *Attorney, Agent, or Firm* — Verrill Dana, LLP

(57) ABSTRACT

Methods and systems for enhancing the biosynthesis of plant-derived compounds, including medicinal compounds, activate plant defense mechanisms by a combination of growth in red and blue light, mechanical injury of leaves or other plant structures, and/or administration of plant defense hormones to the plants. For compounds derivable from biochemical reactions between precursors stored in different parts of a plant or plant tissue, yield and ease of production are further enhanced through in situ activation of enzyme reactions in harvested plant tissues, thereby avoiding the need to purify and react the isolated precursors. The production methods increase yield, reduce the number of production steps required, and improve the safety of the production process. The methods are suitable for use in greenhouse or modular farm environments.

8 Claims, 2 Drawing Sheets

(56) References Cited

OTHER PUBLICATIONS

Pan, Q. et al., "A simple and rapid HPLC-DAD method for simultaneously monitoring the accumulation of alkaloids and precursors in different parts and different developmental stages of *Catharanthus roseus* plants", Journal of Chromatography B, (2016), 1014, pp. 10-16.

Peter, E.K., "Identification and Quantification of Terpenoid Indole Alkaloids from Catharanthus roseus", MS Thesis, Gottfried Wilhelm Leibniz Universitat Hannover, Masterstudiengang Life Science, Apr. 2018, 64 pgs.

Duge De Bernonville, T. et al., "Folivory elicits a strong defense reaction in Catharanthus roseus: metabolomic and transcriptomic analyses reveal distinct local and systemic responses", Scientific Reports, 7:40453; Jan. 17, 2017, DOI: 10.1038/srep40453; 14 pgs.

Pan, Q. et al., "A simple and rapid HPLC-DAD method for simultaneously monitoring the accumulation of alkaloids and precursors in different parts and different developmental stages of *Catharanthus roseus* plants", Journal of Chromatography B, 1014, (2016), pp. 10-16.

\* cited by examiner

CULTIVATION AND TREATMENT OF PLANTS FOR THE PRODUCTION OF PLANT-DERIVED DRUGS

CROSS-REFERENCE TO RELATED APPLICATIONS

This application is the U.S. national phase of PCT/US2020/033286, filed 15 May 2020 and entitled "Cultivation and Treatment of Plants for the Production of Plant-Derived Drugs" and claims priority to U.S. Provisional Application No. 62/848,568, filed 15 May 2019 and entitled "Enzymatic Synthesis of Anti-Cancer Drugs", the entirety of which is incorporated herein by reference.

BACKGROUND

Plants produce many chemical compounds which have found uses in traditional and modern medicine. Most such chemicals are used by plants for defending against insects, fungi, and herbivorous animals. Plant defense chemicals for use in the present technology include alkaloids, glycosides, polyphenols, and terpenes, and each of these classes has medicinal uses.

The Madagascar periwinkle plant produces two critical chemotherapeutic drugs used since the 1960s, namely, vinblastine and vincristine. Vinblastine and vincristine are on the World Health Organization's Model List of Essential Medicines, i.e., medicines that are "essential for addressing the most important public health needs globally". See www.who.int/selection_medicines/list/en/ However, accessibility of these essential medicines is limited by the high cost of these drugs ($4-$60 million/kg) and an unpredictable supply of the drugs from year to year, caused by the varying quantity and quality of leaves yielded from field-grown plants.

Currently, vinblastine and vincristine are produced by semi-synthesis from the more abundant precursors extracted from the leaves of field-grown periwinkle plants. This process involves initial isolation and purification of the precursors from periwinkle plant leaves and synthetic coupling of these precursors to produce vinblastine or vincristine using hazardous reagents such as sodium borohydride ($NaBH_4$), which is corrosive, flammable, and toxic, followed by the final isolation and purification of vinblastine or vincristine. Several semi-synthetic methods exist that involve multiple steps, varying and often low yields (see, e.g., Ishikawa H et al, J. Am. Chem. Soc., 2009, 131, 4904-4916).

There is a need for methods of producing plant-derived drugs such as vinblastine and vincristine which are less complicated, less costly, less toxic, and that consistently produce higher yield.

SUMMARY

The present technology provides methods and systems for enhancing the biosynthesis of plant-derived compounds, including medicinal compounds. The biosynthesis of plant defense compounds is stimulated using a combination of selected growth conditions and activation of plant defense mechanisms. For compounds derivable from biochemical reactions between precursors stored in different parts of a plant or plant tissue, yield and ease of production are further enhanced through in situ activation of enzyme reactions in harvested plant tissues, thereby avoiding the need to purify and react the isolated precursors. The present production methods not only increase the yield of important compounds per plant, but also reduce the number of steps required and improve the safety of the production process.

The present methods can be used to improve the production of compounds such as alkaloids, glycosides, polyphenols, or terpenes from any type of plant that can be grown under controlled conditions. Preferred is the production of plant-derived drugs from precursors that are produced in different cells of a plant and whose final biosynthetic steps can be enzyme-catalyzed upon crushing, cutting, grinding, or homogenizing leaves or other parts of a plant. The production of alkaloids is preferred, and especially preferred is the production of vinblastine and vincristine from Madagascar periwinkle.

One aspect of the present technology is a method of producing an alkaloid compound from plants. The method includes the following steps: (a) growing plants in a controlled environment including red and blue light for a first daily period of time in light and for a second daily period of time in darkness; (b) subjecting leaves or other parts of the plants to a treatment that enhances alkaloid biosynthesis in the plants; (c) waiting for a period of time, during which one or more alkaloid compounds accumulate in the plants; (d) harvesting leaves or other parts of the plants containing the accumulated alkaloid compound; and (e) extracting the alkaloid compound from the harvested leaves or other plant parts.

A variation of the method described above can be used to produce alkaloid compounds derived from one or more precursors, or two or more precursors stored in different parts of the plant, such as in different cells or plant structures. In such a method, step (e) includes homogenizing the harvested leaves or other structures in a buffer solution, whereby the precursors are released and one or more enzymes involved in biosynthesis of the enzymatically synthesized alkaloid compound are also released. The method includes the additional step of: (f) incubating the homogenized leaves from step (e), whereby the enzymatically synthesized alkaloid compound is produced by action of the one or more enzymes on said one or more precursors.

Yet another aspect of the technology is a system for the production of an alkaloid compound from plants. The system includes a greenhouse or modular farm suitable for growth under controlled conditions of a plant capable of biosynthesis of an alkaloid compound, and instructions for carrying out either of the methods described above. The greenhouse or modular farm of the system can provide red and blue grow light illumination of the plants, and optionally can provide a ventilation system capable of stimulating leaf movement of the plants to promote growth and biosynthesis. The system can further include one or more devices for mechanical injury of plant leaves, or for administration plant hormones to plants, or one or more devices for harvesting and/or homogenizing leaves from plants and optionally for performing extraction, isolation, and/or purification of the desired compound(s) or for carrying out needed enzymatic reactions.

The technology can be further summarized in the following list of features.

1. A method of producing an alkaloid compound from plants, the method comprising
   (a) growing plants in a controlled environment comprising red and blue light for a first daily period of time in light and for a second daily period of time in darkness;
   (b) subjecting leaves of the plants to a treatment that enhances alkaloid biosynthesis in leaves of the plants;

(c) waiting for a period of time, during which one or more alkaloid compounds accumulate in leaves of the plants;
(d) harvesting leaves of the plants; and
(e) extracting the alkaloid compound.

2. The method of feature 1, wherein the treatment of step (b) comprises subjecting a set of older leaves of the plants to mechanical injury.

3. The method of feature 2, wherein the mechanical injury is performed by pressing a bristle brush against the leaves.

4. The method of feature 2 or 3, wherein said treatment increases biosynthesis of said one or more alkaloid compounds in young leaves of the plant.

5. The method of any of the preceding features, wherein the treatment of step (b) comprises treating the plants with a plant defense hormone.

6. The method of feature 5, wherein the plant hormone is selected from the group consisting of jasmonate, methyl jasmonate, ethylene, ethephone, 1-aminocyclopropane-1-carboxylic acid, and salicylic acid.

7. The method of any of the preceding features, wherein the treatment of step (b) comprises growing the plants with ventilation that stimulates leaf movement.

8. The method of any of the preceding features, wherein the first daily period is about 8 hours to about 16 hours.

9. The method of any of the preceding features, wherein the one or more alkaloid compounds accumulated in step (c) are precursors of an enzymatically synthesized alkaloid compound, and wherein step (e) comprises homogenizing the harvested leaves in a buffer solution, whereby said one or more precursors are released from cells of the harvested leaves and one or more enzymes involved in biosynthesis of the enzymatically synthesized alkaloid compound are also released from cells of the harvested leaves; the method further comprising
(f) incubating the homogenized leaves from step (e), whereby the enzymatically synthesized alkaloid compound is produced by action of said one or more enzymes on said one or more precursors.

10. The method of feature 9, wherein the homogenizing of step (e) comprises homogenizing the leaves in a buffer solution having a pH selected to optimize activity of said one or more enzymes involved in biosynthesis of the enzymatically synthesized alkaloid compound.

11. The method of feature 10, wherein the pH is in the range from about 6 to about 8.

12. The method of any of the preceding features, wherein the plants are Madagascar periwinkle plants.

13. The method of feature 9, wherein the plants are Madagascar periwinkle plants, the one or more precursors are catharanthine and vindoline, and the enzymatically synthesized alkaloid compound is vinblastine or vincristine.

14. A system for the production of an alkaloid compound from plants, the system comprising
(i) a greenhouse or modular farm suitable for growth under controlled conditions of a plant capable of biosynthesis of an alkaloid compound; and
(ii) instructions for carrying out the method of any of the preceding features.

15. The system of feature 14, wherein the greenhouse or modular farm provides red and blue light illumination of plants and optionally a ventilation system capable of providing stimulatory leaf movement of plants.

16. The system of feature 14 or 15, further comprising one or more devices for mechanical injury of plant leaves, administration of one or more plant hormones to plants, and/or one or more devices for harvesting and/or homogenizing leaves from plants.

DETAILED DESCRIPTION

The technology described herein allows improved production of important plant-derived drugs using methods that include controlled cultivation and treatment of plants that optimize the biosynthesis of compounds such as alkaloids, glycosides, polyphenols, and terpenes, which can serve as drugs or drug precursors. The technology also can be employed in conjunction with the processing of the precursor-rich leaves to improve in situ enzymatic synthesis of drugs. The technology can be used, for example, to produce vinblastine and vincristine from Madagascar periwinkle plants.

The plants are first cultivated under special growth conditions to enhance the concentration of desired metabolites such as alkaloids and certain enzyme levels in the leaves. In some cases, enzymes in the leaves that are responsible for biosynthesis of a desired compound, such as an alkaloid, are allowed to convert the leaf-associated precursors to the desired products in a single vessel after harvesting of the leaves. This obviates the need for prior isolation of the precursors and the need for using hazardous reagents. This technology is both simpler and greener than the semi-synthesis route and has a lower cost of production due to fewer steps and less hazardous methodology.

Figure 1:
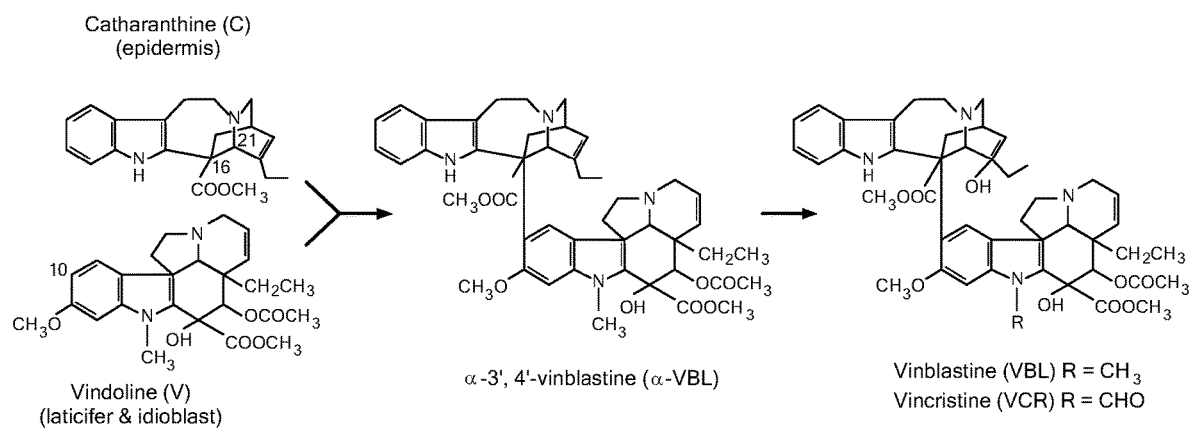
FIG. 1 shows a schematic representation of a pathway for conversion of catharanthine and vindoline to vinblastine and vincristine in the leaves of Madagascar periwinkle plants.

An example of the use of post-harvesting, enzyme-driven alkaloid synthesis is the synthesis of vinblastine and vincristine. These compounds are found in the leaves at low concentrations due to their toxicity to the plant cell, and the required separation and sequestration of their precursors, catharanthine and vindoline in different cells of the leaf (catharanthine in epidermis and vindoline in laticifers and idioblasts). See FIG. 1 for a description of the final enzyme reaction leading to the synthesis of vinblastine and vincristine.

Thus, the present technology can include a process of mechanically rupturing the plant cells, which leads to release and mixing of the precursors and enzymes sequestered in different parts of the leaf, allowing enzymatic conversion of the precursors to vinblastine and vincristine without requiring the initial purification of the precursors or the addition of enzymes responsible for their conversion.

The present inventors have discovered that the yield of alkaloid compounds and precursors of alkaloid compounds, such as catharanthine and vindoline. which are precursors of vinblastine and vincristine, can be increased if plants are cultivated in an environmentally controlled indoor farm or greenhouse and subjected to specialized treatment prior to and optionally after harvesting the leaves. In order to activate plant defense mechanisms and to stimulate the biosynthesis of desired compounds, such as alkaloids, plants can be grown under selected conditions of light wavelength, light intensity, and light/dark daily cycle. An embodiment of the process includes growing the plants for a portion of each day under light containing enhanced spectral intensity at red and blue wavelengths, and including periods of light and darkness each day. For example, the plants can be grown under red and blue full spectrum LED grow lights. The lights can have a power of 10, 20, 30, 45, 60, 75, or 100 watts. The lights can be placed about 1 to 2 feet, or about 2 to 3 feet, or about 3 to 4 feet, or about 4 to 6 feet, from the plants. The plants can be grown without touching one another, such as at least 3, 6, or 12 inches apart at their edges. Temperature, humidity, and carbon dioxide levels can be controlled for optimum growth and/or desired metabolite (e.g., alkaloid) biosynthesis for the plant. Plants can be grown in soil or hydroponically. Plants can be grown, for example, using a daily cycle of light for 16 hours and darkness for eight hours.

Controlled growth conditions can be performed within a greenhouse or modular farm environment. Such environments allow year round growth under controlled conditions of light, temperature, humidity, watering, soil or nutrient solution components, carbon dioxide concentration, and ventilation, and provide options for automation, remote monitoring, data collection. Greenhouses and modular farms also can be outfitted with equipment needed for performing mechanical injury of leaves or other plant structures, for applying plant hormones, and for harvesting and extracting leaves or other structures to obtain a homogenate or even to complete isolation and purification of desired intermediate or end product compounds. The present technology includes a system for production of a desired compound, such as an alkaloid compound from plants. The system can include a greenhouse or modular farm suitable for growth under controlled conditions of a plant capable of biosynthesis of an alkaloid compound and instructions for carrying out any of the methods disclosed herein. The greenhouse or modular farm can provide red and blue light illumination of plants and optionally a ventilation system capable of providing stimulatory leaf movement of plants. The system can further include one or more devices for mechanical injury of plant leaves, administration of one or more plant hormones to plants, and/or one or more devices for harvesting and/or homogenizing leaves from plants, or for processing a homogenate to isolate, partially purify, or purify a compound of interest.

The process also can include subjecting the plants to gentle injury of their leaves or other parts, such as stems, buds, flowers, fruit, or roots, to induce or stimulate plant defense mechanisms. Any suitable method can be used to mechanically injure leaves or other parts of the plants. For example, a bristle brush can be pressed against the leaf surface, including any type of multi-punctate or multi-pin device that can be pressed against the leaf with or without puncturing the leaf. The device described at www.hoebrush/#/ can be used, for example. After mechanical damage to the plant, a waiting period of several days (e.g., at least 1, 2, 3, 4, 5, 6, 7, or 10 days or more) can be allowed for accumulation of desired metabolites, such as alkaloid compounds, before harvesting the suitable parts or tissues from the same plants.

It can be useful to apply mechanical injury to one part of a plant and to later harvest another part of the same plant, where accumulation of desired compounds has occurred. For example, in order to enhance production of precursors for vinblastine and vincristine in Madagascar periwinkle plants, it is advantageous to injure older leaves, found at the bottom part of the plant (e.g. the 4th and 5th leaf pairs, and to later harvest younger leaves at the middle or top of the plant, together with older or senescing leaves (which are enriched in the enzyme needed to convert the precursors into vinblastine and vincristine).

An alternative to applying mechanical injury is to treat the plants with one or more plant hormones, such as one or more plant defense hormones. Such hormones also can be applied in addition to mechanical injury. Examples of suitable plant defense hormones are jasmonate, methyl jasmonate, ethylene, ethephone, 1-aminocyclopropane-1-carboxylic acid, and salicylic acid. Any derivatives of jasmonate, ethylene or salicylic acid can be used as well, either singly or in combination. Such hormones can be applied by spraying the plants or soil with a solution containing the hormone in one or more applications as appropriate for enhancing the biosynthesis of desired metabolites.

The process can further include mechanically rupturing cells of the harvested leaves or other plant structures, such as by homogenization in a buffer solution, thereby causing release and mixing of precursors and enzymes sequestered in different parts of the leaves or other structures, allowing enzymatic conversion of the precursors under favorable in vitro conditions to desired end products, such as vinblastine and vincristine, to proceed in the homogenate. The homogenization buffer solution can provide a suitable biochemical environment to support optimal enzymatic conversion. For example, favorable conditions for the enzymatic reaction(s) can include a pH value near the optimum for the enzyme(s) in question, such as in the range of pH 4-6, pH 5-7, pH 6-8, or pH 7-9; addition of protease inhibitors that preserve enzyme activity, and the addition of required reactants and/or cofactors (e.g., for the production of vinblastine and vincristine, suitable reactants and cofactors include $H_2O_2$, heme, manganese, and calcium, which are preferably provided in an equimolar mixture). Support, in terms of reaction conditions in the homogenization buffer solution, or a subsequently added or exchanged solution, substrates, or cofactors, can be provided for any enzyme relevant to the final step or steps of synthesis of a desired compound. Relevant enzymes include oxidases and peroxidases, particularly enzymes that use redox reactions to couple carbon atoms between precursor molecules. Homogenization of leaves or other plant structures or tissues can be performed by any known method, including use of a mortar & pestle, bead beater, blender, or other plant tissue homogenizer. Preferably, harvested plant structures are cut or mechanically disrupted to form small pieces and transferred to a homogenization buffer just prior to homogenization. Plant parts also can be frozen or freeze-dried prior to homogenization. One or more exogenous enzymes, either of a type found in the homogenized plant material or of a type not found therein, optionally can be added to the homogenate to enhance a desired reaction or to promote a different reaction than would occur without the enzyme addition. A desired enzyme-catalyzed conversion can occur during or following homogenization. Yield of a desired product may be enhanced by incubation of the homogenate under favorable conditions for a period of time, such as about 10 minutes, 30 minutes, one hour, or two hours, or more.

The present technology can be used with any type of plant capable of the biosynthesis of any type of compound of interest, such as for use in chemistry, biochemistry, pharmacological, or medical applications. Examples of suitable plants include Madagascar periwinkle (*Catharanthus roseus*), autumn crocus (*Colchicium autumnale*), Pacific yew tree (*Taxus brevifolia*), May apple (*Podophyllum*), Happy tree (*Camptotheca acuminata*), and opium poppy (*Papaver somniferum*), The present technology also can be used to enhance the production of any compound biosynthesized by a plant, such as plant defense compounds, alkaloids, vinca alkaloids, vinblastine, vincristine, catharanthine, vindoline, paclitaxel, cholchicine, demecolcine, podophillotoxin, combretastatins, noscarpine, and camptothecin.

The process described herein lowers the cost of producing alkaloids such as catharanthine, vindoline, vinblastine, and vincristine for several reasons. The process increases the starting concentrations of precursors such as catharanthine and vindoline in the leaves. Isolation and purification of precursors such as catharanthine and vindoline are avoided. Synthetic steps with low yield on isolated components are replaced with a simple incubation that takes advantage of enzymes naturally present in leaf homogenates, while avoiding the use of hazardous and costly reagents and their disposal. Additionally, the present technology ensures a more dependable supply of needed compounds such as catharanthine, vindoline, vinblastine, and vincristine compared to harvesting plants grown outdoors, since the plants can be grown under controlled conditions year-round with higher yield of the compounds.

EXAMPLE

Six different Madagascar periwinkle plants (*Catharanthus roseus*) were grown under special growth conditions to increase their catharanthine and vindoline content. The combination of special growth conditions (in the presence of red and blue light for 16 hours) and treatments (injury by pressing the oldest leaves with a bristle brush) was found to increase the precursor content of catharanthine and vindoline by five- to nine-fold over that reported in the literature (Pan Q et al, Journal of Chromatography B, 1014 (2016) 10-16).

Figure 2:
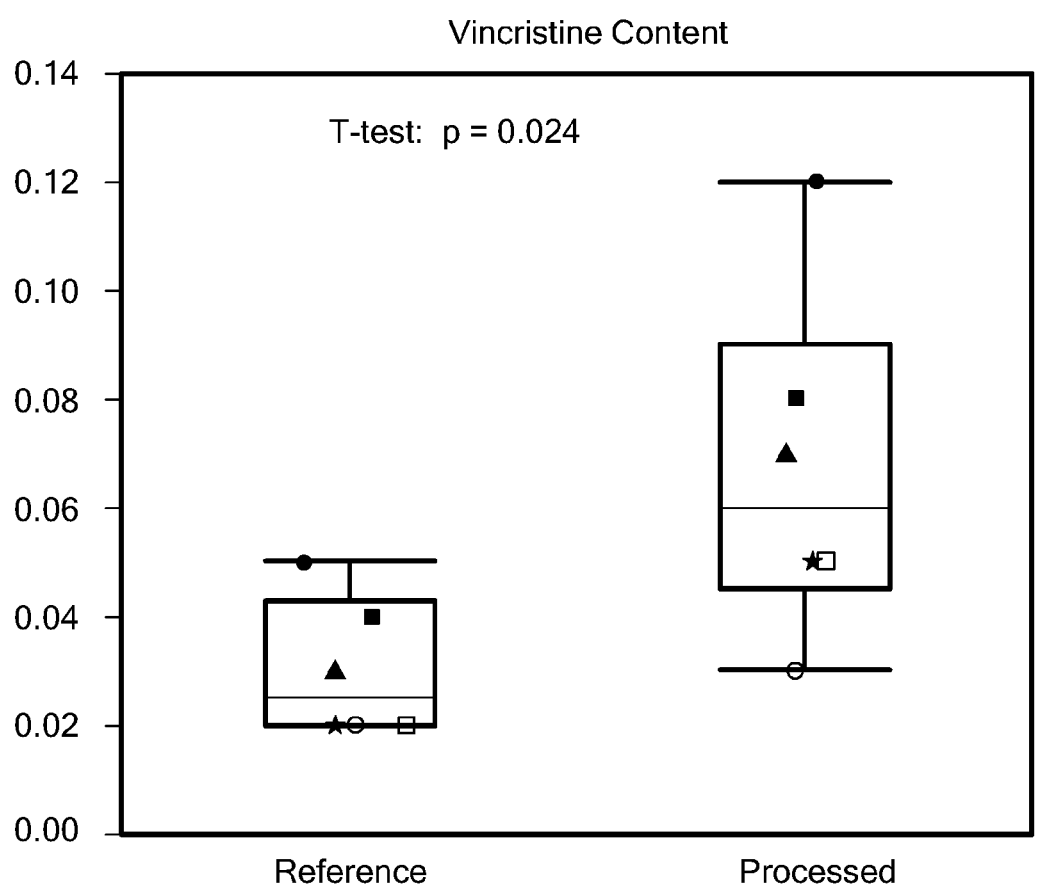
FIG. 2 shows the amount of vincristine extracted from leaves of Madagascar periwinkle plants without (Reference) and with processing (Processed) of the leaves to promote enzymatic synthesis. Dots denote different leaf sets; p=0.024.

Leaves were divided equally into a reference set and a processed set to yield the same starting material. The reference leaves were flash-frozen in liquid nitrogen and freeze-dried for 12 hours to minimize enzyme activity and then subjected to two rounds of extraction using methanol. The extracted products were analyzed using reverse phase liquid chromatography (C18 column) with UV detection and mass spectrometry for catharanthine, vindoline, vinblastine, and vincristine content. On the other hand, the processed leaves were ground using a mortar and pestle, mixed, and incubated in a buffer at pH 7 to enzymatically convert the precursors before being flash-frozen and freeze-dried. Next, two extractions were performed with methanol, and the products analyzed for catharanthine, vindoline, vinblastine, and vincristine content using reverse phase liquid chromatography as described for the reference leaves. A two-fold increase in the vincristine content was found in processed leaves compared to reference leaves (FIG. 2).

As used herein, "consisting essentially of" allows the inclusion of materials or steps that do not materially affect the basic and novel characteristics of the claim. Any recitation herein of the term "comprising", particularly in a description of components of a composition or in a description of elements of a device, can be exchanged with the alternative expressions "consisting essentially of" or "consisting of".

What is claimed is:

1. A method of producing vinblastine and/or vincristine from plants, the method comprising
   (a) growing *Catharanthus roseus* plants in a controlled environment comprising red and blue light for a first daily period of time in light and for a second daily period of time in darkness;
   (b) subjecting leaves of the plants to mechanical injury that enhances catharanthine and/or vindoline biosynthesis in leaves of the plants;
   (c) waiting for a period of time, during which catharanthine and/or vindoline accumulate in leaves of the plants;
   (d) harvesting leaves of the plants;
   (e) homogenizing the harvested leaves in a buffer solution to form a homogenate, whereby said catharanthine and vindoline are released from cells of the harvested leaves and one or more enzymes involved in biosynthesis of vinblastine and/or vincristine are also released from cells of the harvested leaves in the homogenate;
   (f) incubating the homogenate for a period of time, whereby said vinblastine and/or vincristine are produced by action of said one or more enzymes on said catharanthine and/or vindoline; and
   (g) extracting the enzymatically synthesized vinblastine and/or vincristine from the homogenate.

2. The method of claim 1, wherein the mechanical injury is performed by pressing a bristle brush against the leaves.

3. The method of claim 2, wherein said mechanical injury increases biosynthesis of said catharanthine and/or vindoline in young leaves of the plant.

4. The method of claim 1, wherein the treatment of step (b) further comprises treating the plants with a plant defense hormone.

5. The method of claim 4, wherein the plant hormone is selected from the group consisting of jasmonate, methyl jasmonate, ethylene, ethephon, 1-aminocyclopropane-1-carboxylic acid, and salicylic acid.

6. The method of claim 1, wherein step (a) further comprises growing the plants with ventilation that stimulates leaf movement.

7. The method of claim 1, wherein the first daily period is about 8 hours to about 16 hours.

8. The method of claim 1, wherein the buffer of step (e) has a pH in a range from about 6 to about 8.

* * * * *